United States Patent
Gauchel et al.

[19]

[11] Patent Number: 6,093,359
[45] Date of Patent: Jul. 25, 2000

[54] REINFORCED THERMOPLASTIC COMPOSITE SYSTEMS

[76] Inventors: James V. Gauchel, 468 Hudson Ave., Newark, Ohio 43055; Robert M. Skrowronek, 974 Ridge Crest Dr., Gahanna, Ohio 43230; Thomas F. Martin, III, 7358 Whispering Oak Dr., Sylvania, Ohio 43560; Anthony G. Hankin, Nr. Hesket Newmarket, Millhouse, Cumbria CA7 8HT, United Kingdom

[21] Appl. No.: 08/964,694

[22] Filed: Nov. 6, 1997

[51] Int. Cl.$^7$ ........................................................ B27N 3/10
[52] U.S. Cl. ........................... 264/257; 264/109; 524/35; 524/521; 524/528
[58] Field of Search ............................... 524/35, 522, 521, 524/527, 528; 264/109, 257, 128, 294, 258, 113, 122, 119, 134; 210/649–655

[56] References Cited

U.S. PATENT DOCUMENTS

| | | |
|---|---|---|
| 3,304,282 | 2/1967 | Cadus et al. . |
| 3,628,991 | 12/1971 | Thiele et al. . |
| 3,716,449 | 2/1973 | Gatward et al. ........................ 162/101 |
| 3,883,473 | 5/1975 | Kucsma . |
| 4,426,470 | 1/1984 | Wessling et al. ......................... 524/35 |
| 4,455,398 | 6/1984 | Budich et al. . |
| 4,536,360 | 8/1985 | Rahrig . |
| 4,692,375 | 9/1987 | Neubauer et al. . |
| 4,747,951 | 5/1988 | Ellis ....................................... 210/649 |
| 4,767,321 | 8/1988 | Chilva . |
| 4,793,802 | 12/1988 | Chilva . |
| 4,801,627 | 1/1989 | Rahrig et al. . |
| 4,802,843 | 2/1989 | Chilva . |
| 4,950,532 | 8/1990 | Das et al. . |
| 5,008,145 | 4/1991 | Kinson et al. . |
| 5,215,627 | 6/1993 | Willis et al. . |
| 5,348,798 | 9/1994 | Berghuis et al. . |
| 5,393,379 | 2/1995 | Parrinello . |
| 5,468,437 | 11/1995 | Hall . |

*Primary Examiner*—Merrick Dixon

[57] ABSTRACT

A process is disclosed for the manufacture of reinforced composites. This method provides a process that allows for the direct mixing of discontinuous reinforcement such as wet chopped strands of glass fiber or continuous reinforcement such as glass strands, with an aqueous suspension of a solution polymerized polymer, such as polyvinyl chloride. The process results in a cost-effective means for reinforcing polymers such as PVC while simultaneously substantially improving properties such as impact strength, stiffness, and moldability without the need for a binder.

19 Claims, 2 Drawing Sheets

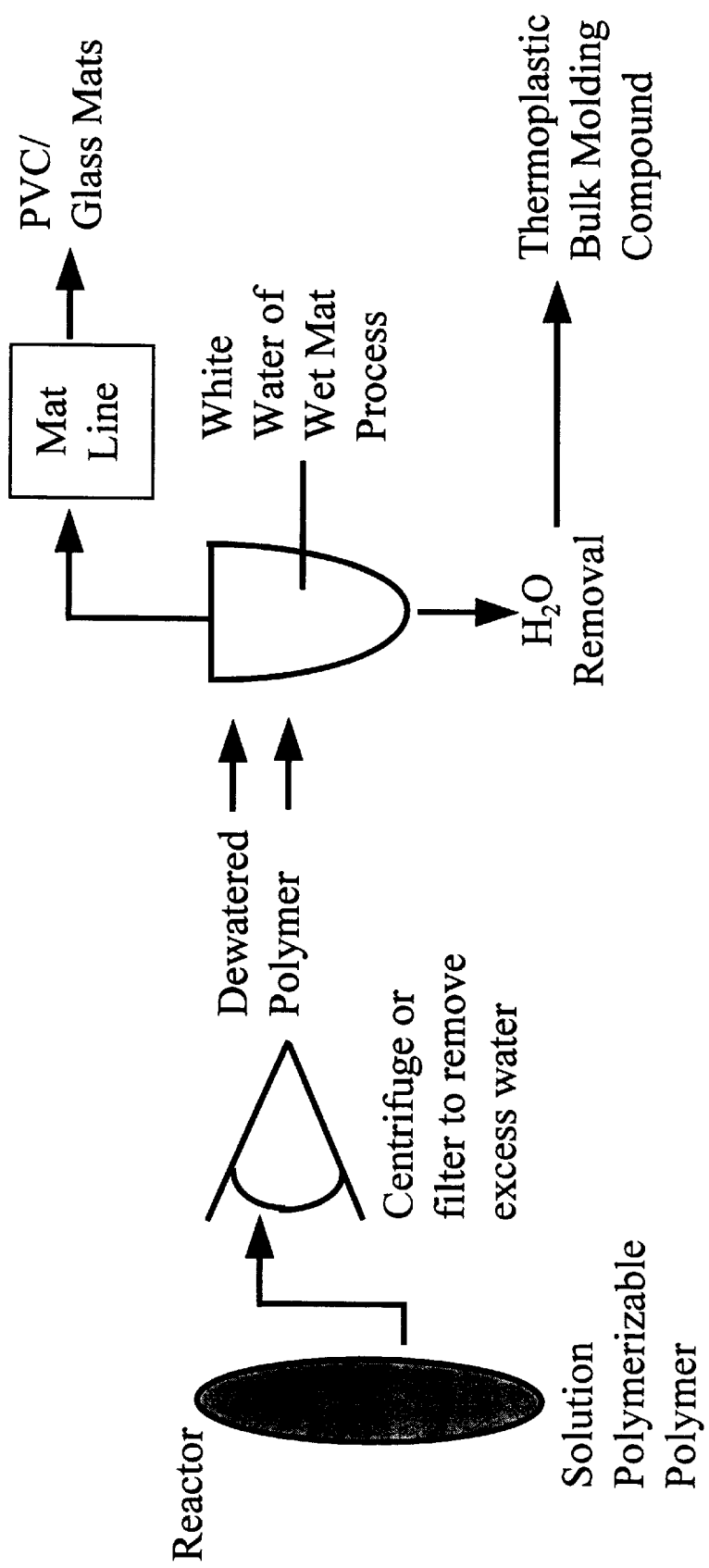
Fig. 1 Schematic Representation of an Embodiment of the Process According to the Present Invention

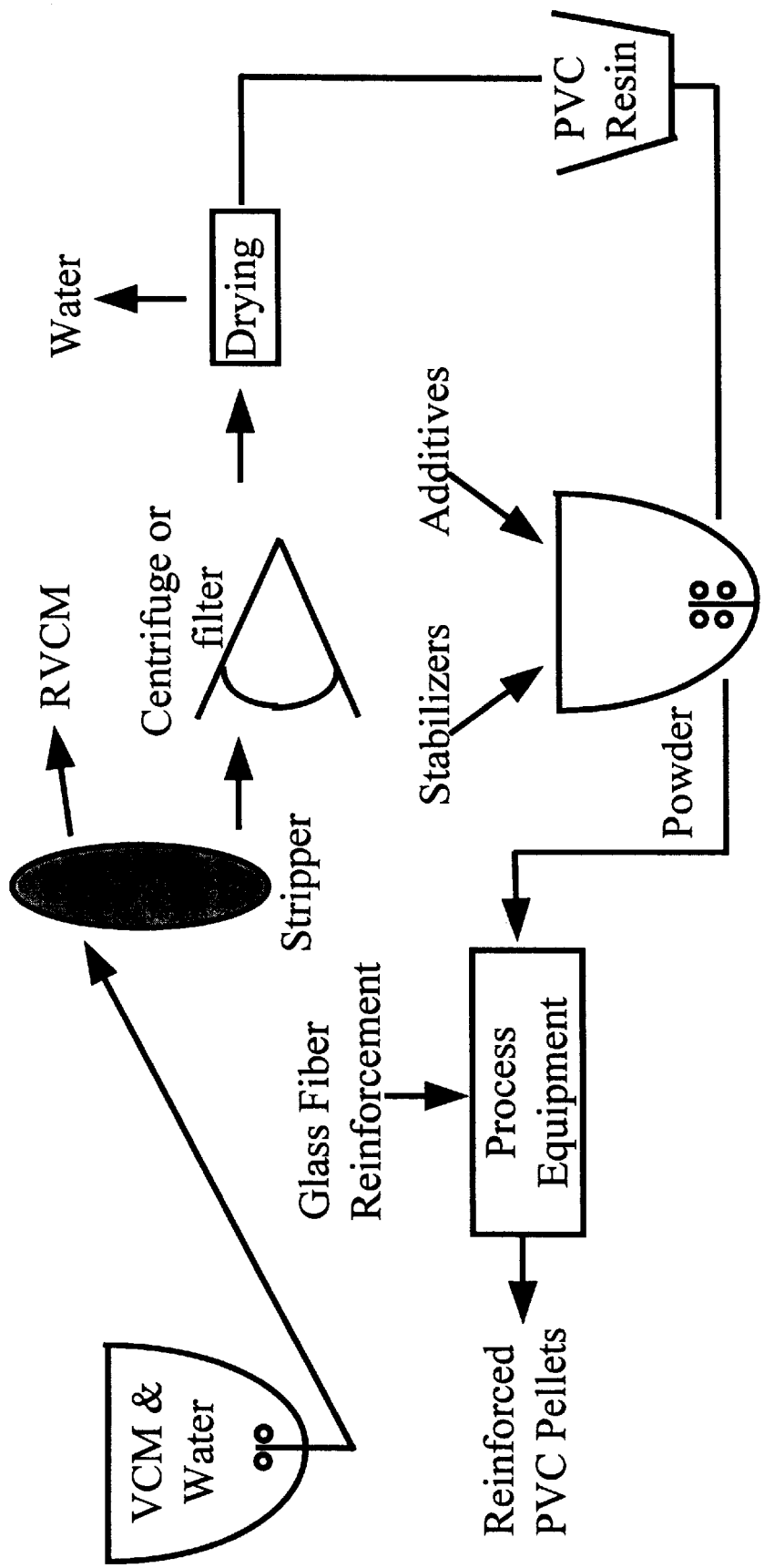
Fig. 2 Schematic Representation of Conventional Process in the Art

REINFORCED THERMOPLASTIC COMPOSITE SYSTEMS

TECHNICAL FIELD AND INDUSTRIAL APPLICABILITY OF THE INVENTION

The present invention relates to a process and method for manufacturing reinforced thermoplastic composites. In particular, the present invention provides a process for the manufacture of reinforced thermoplastic composite compositions such as: (1) Glass Mat Thermoplastic (GMT) a molding compound containing polyvinylchloride (PVC) resin; (2) reinforced bulk molding compound (BMC) and sheet molding compound (SMC) containing PVC resin; (3) continuous roving impregnated with PVC resin; and (4) other reinforced thermoplastic polymer composites as per the invention. According to this process, the reinforcing component such as wet chopped strands of glass fiber, glass fiber strands, glass spheres or flakes is directly combined with the contents of a white water tank containing a suspension of polymerized polymer such as PVC. The process may also be carried out by adding the reinforcement to the solution polymerization chamber while the monomer and/or oligomer is polymerizing. This type of process results in a cost-effective means for reinforcing polymers such as PVC while improving impact strength, heat distortion and stiffness without the need for added chemical binders. The process can also result in the elimination of a number of manufacturing steps such as centrifugation, filtration, drying and grinding.

BACKGROUND OF THE INVENTION

Chopped glass fibers are commonly used as reinforcement materials in thermoplastic articles. Typically such fibers are formed by drawing molten glass into filaments through a bushing or orifice plate, applying a sizing composition containing lubricants, coupling agents and film-forming binder resins to the filaments, gathering the filaments into strands, chopping the fiber strands into segments of the desired length and drying the sizing composition. These chopped strand segments are thereafter mixed with a polymerized resin and the mixture supplied to a compression or injection molding machine to be formed into glass fiber reinforced plastic articles. Typically, the chopped strands are mixed with dried powder of a polymerized thermoplastic resin, and the mixture supplied to an extruder wherein the resin is melted, the integrity of the glass fiber strands is destroyed and the fibers are dispersed throughout the molten resin, and the fiber/resin mixture is formed into pellets. These pellets are then fed to the molding machine and formed into molded articles having a substantially homogeneous dispersion of the glass fibers throughout.

Alternatively, fiber reinforced thermoplastic composites may be formed from compression molding of fibrous mats laden with thermoplastic polymer. Methods of making such fiber reinforced composite materials from an aqueous slurry of solid polymer and reinforcing material are known. See Published European Patent Applications 0,148,760 and 0,148,761, Wessling et al., U.S. Pat. No. 4,426,470 issued Jan. 17, 1984 and Gatward et al., U.S. Pat. No. 3,716,449 issued Feb. 13, 1973, all of which are incorporated herein by reference. In general, these reinforced polymer composites have a uniform mixture of fiber, polymer and binder, and are prepared from dilute aqueous slurries of a solid heat-fusible organic polymer, a reinforcing material and optionally a latex binder. Wessling et al. U.S. Pat. No. 4,426,470 issued Jan. 17, 1984 discloses on column 4, lines 18–21 that various chemical additives such as antioxidants, UV stabilizers, thickeners, foaming agents, antifoaming agents, bactericides, electromagnetic radiation absorption agents, etc., may also be used in the composites comprising a heat fusible polymer and reinforcing material.

Alternatively, sections of a preformed glass mat, or other shaped glass mat, for example U-shaped channel, or chair seats, may be impregnated with a thermoplastic resin powder, and then thermoformed under sufficient heat and pressure to melt the thermoplastic polymer and bond the glass mat. For PVC impregnated glass mats, the PVC is typically dry mixed with a thermal stabilizer and alpha-SAN, and any other additives, to form a homogenous powder prior to impregnation of the glass mat. If the glass mat is to be impregnated with an impact modified blend, the impact modifier is typically added as a powder and dry-mixed with the other ingredients and does not interfere with formation of the single phase of PVC and alpha-SAN. Thereafter, the glass mat is then 'dusted' or 'filled' with the desired amount of the powder mix, generally so that there is from about 30% to about 60% mix evenly spread through the mat, and the dusted mat is then molded under pressures of from 100–1000 psi and temperatures of from 170–190° C., to form the shaped glass fiber reinforced PVC blend article.

Glass mat, or other shaped glass fiber stock may also be impregnated with a melt of the blend ingredients, such as in pultrusion. Typically, there is about an equal weight of resin and glass fibers in each sheet. Several such sheets may be cut to a predetermined configuration, stacked in a mold and conventionally molded at a temperature of 160–200° C. and a pressure of about 1000 psi (about 30,000 lbf) to form a thick-walled shaped article.

Although there are numerous methods for making reinforced composite molding materials, many of these processes are either too inefficient, or cannot be sufficiently controlled to produce a fiber reinforced product that provides the resulting composite article with sufficient properties, such as strength, to meet performance requirements. Thus, even with the current technology of aqueous methods for making reinforced composite materials, there are numerous drawbacks, including the loss of polymer properties as a result of the manufacturing process. Specifically, in the previous technology when using solution polymers such as polyvinyl chloride, the vinyl chloride is polymerized, stripped of residual free monomer, the polymer is then processed by some combination of centrifugation, filteration, and drying. Additives are usually blended at this point. Typically, the dry polymer is combined with the reinforcement either by extrusion, dry blending, or aqueous methods. However, once compounded, the PVC has a significant heat history since prior to it being combined with reinforcement it has already been heated in order to be dried. Then there is the subsequent heating that occurs while being combined with the reinforcement. As a result, prior to the compound ever being molded to a final product, a number of important properties have already been reduced by the multiple applications of heat to the polymer.

Accordingly, a need exists for a more efficient process that controllably yields a fiber reinforced molding compound that provides enhanced performance characteristics to the composite articles molded therefrom. Such a process would preferably eliminate the need for binder and improve the heat history of the polymer. This need is fulfilled by the process of the invention described below.

In addition to the above drawbacks, the current injection molding technology does not have the ability to retain the length of the reinforcement material. In particular, the present technology for combining reinforcement and polymer results in a compound that has the consistency of sand, thus obliterating the length of the reinforcement. The invention described below has the ability to retain reinforcement length. For example, if a 1¼" chopped glass fiber is used, the final composite contains reinforcement essentially of that length. The same is true for using continuous reinforcement.

SUMMARY OF THE INVENTION

The present invention provides an efficient aqueous process for making reinforced polymer molding compound and composites. Not only does the process eliminate the need for binder as well as a number of processing steps, but even more significantly, the process dramatically increases the available options in terms of molding and performance, compared to previous methods using equal reinforcement content. Properties such as impact, flexural and tensile strengths are increased dramatically compared to conventionally reinforced molded composites. (See Table 1). The process of the invention provides reinforced molding compounds ranging from granular and sheet to film and continuous. The resulting mats or reinforced molding composite can be used in the manufacture of articles as diverse as siding, gutters, and commercial windows.

In general, the invention is primarily directed toward the production of thermoplastic compounds such as: (1) glass mat thermoplastic (GMT); (2) bulk molding compound (BMC); (3) reinforced polymer films; or (4) impregnated continuous glass strand, roving, yarn, mat or fabric. One embodiment of the process allows for the direct mixing of heat stabilized polymer to be directly added, along with reinforcement material, to a white water tank. An additional embodiment utilizes heat stabilized undried polymer which is put into a white water tank and then directly mixed with the reinforcement. In another embodiment, the process comprises the use of a suspension of solution polymerized polymer that may be substantially free of residual monomer. Reinforcement material such as wet chopped glass strands, is then dispersed throughout the polymer suspension. A GMT or BMC is then prepared as usual without the need for any addition of binder. In another embodiment, the reinforcement material is continuous such as with a continuous glass strand, roving or yarn. The resulting impregnated complex may be used as input to various secondary processes such as filament winding, weaving, pultrusion and compression molding.

A further embodiment comprises adding the reinforcement material to the solution polymerizeable polymer prior to, or simultaneous with, the polymerization process.

A particular aspect of the process of the invention comprises the following: vinyl chloride monomer is polymerized in an aqueous medium to form an aqueous suspension of polyvinyl chloride; excess free monomer of vinyl chloride is removed; glass fiber strands comprised of a multiplicity of substantially continuous glass fibers are chopped into segments of the desired length, the chopped glass fiber strands either wet or dry are then dispersed throughout the PVC suspension. A sufficient amount of the aqueous medium is then removed so as to form a moldable composition. In another aspect of the invention, a continuous strand of glass, carbon or other reinforcement is drawn through the aqueous suspension of PVC or other polymer.

Molded products made according to the invention have comparable or improved physical properties compared to molded products made from systems prepared by previous aqueous and nonaqueous methods.

BRIEF DESCRIPTION OF THE DRAWINGS

FIG. 1 is a schematic representation of an embodiment of the process of the invention. The obvious benefits are simplification of the process by the removal of a number of steps such as drying of polymer and dry blending. The schematic illustration demonstrates that the process allows for the starting materials such as the reinforcement and polymer to be used at the earliest point so as to lower the cost of materials. It is also clear from the schematic that the resulting compound contains polymer with little or no heat history.

FIG. 2 is a schematic representation of the conventional process presently used in the art.

DETAILED DESCRIPTION AND PREFERRED EMBODIMENTS OF THE INVENTION

The present invention provides a process for the manufacture of reinforced composites. This method allows for the direct and cost effective mixing of reinforcements in any form, such as wet chopped glass, dry chopped glass, continuous glass strand, wet continuous glass strand or glass flakes into a white water tank containing an aqueous suspension of solution polymerized polymers such as polyvinyl chloride. As used herein, "white water system" is an aqueous solution in which the reinforcing fibers are dispersed and which can contain numerous dispersants, thickeners, softeners, hardeners, or dispersed or emulsified thermoplastic monomers capable of solution polymerization. Typical examples of various white water systems include aqueous solutions having acrylamide monomers alone or with hydroxyethyl cellulose and the like suspending aids to provide a highly viscous aqueous solution at high material concentrations. Also, white water systems include those having any of the numerous amine oxide surfactants as shown in U.S. Pat. No. 4,179,331. In addition to such chemicals as acrylamides or amine oxides being present in the white water system, there can also be present small amounts of surfactants such as polyethoxylated derivatives of amide condensation products of fatty acids and polyethylene polyamines as is shown in U.S. Pat. No. 4,265,704. Also numerous other chemical agents can be added to a white water system as is known by those skilled in the art.

Reinforcement useful in the invention include dispersible materials, non-dispersible materials and combinations of the two forms. Preferred dispersible reinforcements include materials such as wet chopped strands of glass, aramides, carbon, polyvinyl alcohol (PVA), hemp, jute, organic materials, mineral fibers and rayon. Preferred non-dispersible reinforcement materials include dry chopped strands and glass fibers designed for processes such as SMC molding, BMC molding and continuous panel fabrication; chopped and continuous reinforcements such as aramide, carbon, glass, wollastonite, jute; mica, flake glass, glass and carbon spheres, mats, organic materials, mineral fibers, and fabrics.

The preferred reinforcement materials include organic and inorganic materials such as graphite, metal fibers, aromatic polyamides, cellulose and polyolefin fibers, but preferably and advantageously comprises glass fibers such as wet chopped glass strands having a length of about ⅛ to 2.0 inch (about 3.2 to about 50.8 mm), milled glass fibers which generally have a length of about 1/32 to ⅛ inch (about 0.79 to 3.2 mm) and mixtures thereof. The preferred type of reinforcement is glass fiber in any of its commercially produced compositions. The fibers are preferably surface treated with chemical sizing or coupling agents which are well known in the art. Preferred sizings are selected so as to aid in dispersion without negatively affecting properties in the dispersed reinforcement systems. The preferred sizings for nondispersed reinforcement systems are selected to minimize dispersion. The preferred sizing should be compatible with the polymer of choice such that properties are optimized. The most preferred continuous glass strand or chopped glass fiber reinforcement is used wet.

A preferred fiber reinforcement is wet chopped glass obtained from Owens Corning. Similarly the fiber reinforcement may be used in the form of a continuous glass strand. For example, glass strands such as TYPE 30® roving obtained from Owens Corning may be used. Preferably, the glass strand or chopped glass fibers is used wet and added to the solution polymerized polymer. Typical water content for wet chopped strands ranges from about 10% to about 25%. For continuous roving it ranges from about 2% to about 15%.

The reinforcing material generally comprises from about 10 to about 80 weight percent of a composite when using chopped material. When using continuous reinforcement material the weight percent of reinforcement generally comprises from about 30 to about 80 weight percent of the composite. In applications where a rigid molded part is desired the reinforcing material generally comprises from about 10 to about 80 weight percent of the composite. Whereas in applications such as films where minimum stability is required from the reinforcing material it generally comprises from about 10 to about 50 percent of the composite. In a preferred embodiment it comprises from about 20% to about 40% of a composite using chopped material. When using continuous reinforcement to produce a prepreg, the prepreg will generally contain about 20% to about 60% polymer by weight. In a more preferred embodiment it will contain about 25% to about 45%. When using noncontinuous reinforcement the composite will generally contain about 50 to about 90 percent polymer by weight. In a more preferred embodiment it will contain about 60 to about 80 percent.

Aqueous suspensions of polymers useful in the invention, include suspensions wherein the polymer particle size ranges from about 10 microns to about 500 microns. In a more preferred embodiment, the average particle size ranges from about 30 microns to about 200 microns. The polymer particle size used will typically be larger or on the same order as the filament diameter of the reinforcement material.

One of the direct processes of the invention for producing a reinforced polymer composite or mat involves forming an aqueous suspension of discontinuous fibers like wet chopped glass fibers and an aqueous suspension of a thermoplastic polymer usually with agitation in a mixing tank. The resulting combined aqueous suspension, usually referred to as slush or pulping medium, may be processed into a wet-laid, sheet-like material by such machines as cylinder or Fourdinier machines or other technologically advanced machinery, such as the Stevens Former, Roto Former, Inver Former and the VertiFormer machines. The slush is deposited from a head box onto a moving wire screen or onto the surface of a moving wire-covered cylinder. The slurry on the screen or cylinder is processed into the nonwoven, sheet-like mat by the removal of water, usually by a suction and/or vacuum device. This process is exemplified in U.S. Pat. No. 5,393,379.

The sheet-forming and dewatering process may be accomplished by any conventional paper making apparatus such as a sheet mold or a Fourdrinier or cylinder machines.

After the mat is formed into a dewatered sheet, it may be desirable to densify the sheet by pressing it with a flat press or by sending it through calendering rolls. Densification after drying of the mat is particularly useful for increasing the tensile and tear strength of the mat. Drying of the mat may be either air drying at ambient temperatures or oven drying.

The process of the invention provides for the direct formation of molding compound containing from about 10% to about 80% reinforcing material. Preferably, the process provides for molding compound having from about 20% resin to about 90% resin.

In the process, a dilute aqueous suspension is prepared containing the monomer particulates to be polymerized. The suspension solution will also contain the necessary initiator. In addition, depending upon the solution polymerizable polymer used, a heat stabilizer may also be added. For polymers using a heat stabilizer, it may be added at the time of polymerization, when the reinforcement material is added, or any other convenient time during the process. The solution of monomer is then allowed to polymerize. If desired, after polymerization any free excess monomer is removed or stripped from the polymer solution. This step may be avoided by starting with previously polymerized material that is wet or dry.

The preferred polymer of the invention is solution polymerizeable. Solution polymerizeable polymers such as polyvinylchloride (PVC), acrylonitrile-butadiene-styrene (ABS), and polypropylene (PP) are among the preferred. Additionally, suitable polymers include addition and condensation polymers such as, for example, the polyolefins, polystyrenes, phenolics, epoxies, butadienes, acrylonitriles, and acrylics. In addition the preferred polymer will be "heat fusible." By "heat fusible" is meant that the polymer particles are capable of deformation under heat to join into a unitary structure. The heat fusible polymers may be either thermoplastic or thermoset resins. The heat fusible organic polymer component of the present invention is desirably a hydrophobic, water insoluble polymer.

The solution polymerized polymers generally, and are advantageously, either PVC, ABS or PP. The polymers are generally employed in an amount from about 20 to about 90 percent by weight of the solids (dry weight basis of the combined weight of fibers and formulated resins). A particularly preferred organic polymer is a polyvinyl chloride resin that already contains a heat stabilizer. Polymer blends may be used as well. Whether one polymer is used or a blend, the preferred initiator will be selected for the particular monomer or blend of monomers in use.

In another process of the invention, a strand of substantially continuous glass fibers is formed by conventional techniques such as drawing molten glass through a heated bushing to form a multitude of substantially continuous glass fibers and collecting the fibers into a strand. Any apparatus known in the art of producing such fibers and collecting them into a strand can suitably be used in the present invention. Suitable fibers are fibers having a diameter of from about 3 to about 90 microns, and suitable strands may contain from about 50 to about 4000 fibers. Preferably, the strands formed in the process of the invention contain from about 200 to about 2000 fibers having a diameter of from about 3 to about 25 microns.

After the fibers are formed, and prior to their collection into a strand, the fibers are coated with the sizing of the invention. Preferably the sizing composition is selected so as to aid in the dispersion of the reinforcement in the white water solution of polymerized polymer. For example, a preferred sizing for a continuous glass roving reinforcement will allow for use of a wet roving i.e. having about 2 to about 15% by weight water. The sizings are preferably water-based and comprise one or more silanes, film-formers, surfactants, etc. An example, of such sizing would be Owens-Corning's wet chopped fiber with a sizing designated 9501. When using PVC in a embodiment the preferred sizing contains an amino silane such as A1126, A1125, A1120, A1102, and A1100 obtainable from union carbide.

As one of ordinary skill in the art knows, the final material may be UV stabilized or not depending on the needs and use of the composite. In addition, the material may contain any number of other additives, such as colorings, necessary to meet the functional performance of the application.

EXAMPLE I

Preparation of GMT from Wet Chopped Glass Fiber

A randomly oriented, 1-inch glass fiber/PVC sheet was successfully formed on a wet process mat line by mixing heat stabilized PVC powder directly with wet chopped glass strands obtained from Owens Corning in a white water tank. No additional chemical binder was added or needed. Process limits in terms of sheet weight and maximum drying temperatures for various line speeds were determined as is usual in the art. The PVC powder could be sintered to the glass at 25 ft/min with little, if any, resin degradation. The resulting mats contained 80% PVC resin (by weight) and 20% fully dispersed E-type glass fibers.

The mats were successfully molded into panels. The actual molding of the composite panel was preformed by stacking several sheets of the in-line dried mat (no more than 1% water retention), molding in a heated press, and then cooling under pressure. The physical properties of the panels obtained from such mats may be found in Table 1 shown below. Table 1 compares the properties of panels molded from composite glass fiber mats made via the inventive process (designated Direct Process) to molded panels made without reinforcement (designated Unreinforced) and molded panels made from the current technology (designated Prior Technology). The prior technology utilizes PVC and glass pellets; which were used directly in injection molding. As shown in Table 1, not only are the properties of the panels molded from the glass mats of the invention comparable to those of the prior technology, but for a number of properties they are significantly superior.

TABLE 1

| Designated | Direct Process | Unreinforced | Prior Technology |
|---|---|---|---|
| Polymer Type | PVC | PVC | PVC |
| Glass Form | Wet Chopped Strands | None | Dry Chopped Strands |
| Glass Fiber Input Length | 25 mm | — | 4 mm |
| Glass Content by weight | 20% | 0% | 20% |
| MECHANICAL | | | |
| Tensile Strength (ksi) | 15 | 6.3 | 14 |
| Tensile Elongation (%) | 2.5 | 35 | 2 |
| Tensile Modulus (Msi) | 1 | 0.35 | 1.1 |
| Flexural Strength (ksi) | 26 | 10.3 | 22 |
| Flexural Modulus (Msi) | 1.2 | 0.36 | 1 |

TABLE 1-continued

| | | | |
|---|---|---|---|
| Izod Ipact Strength, Notched (ft-lbs/in) | 4 | 7.4 | 1.6 |
| Izod Impact Strength, Unnotched (ft-lbs/in) | 6 | — | 6.5 |
| THERMAL | | | |
| Coefficient of Thermal Expansion (in/in-° F.) | $1.6 \times 10^{-5}$ | $4 \times 10^{-5}$ | $1.2 \times 10^{-5}$ |
| PHYSICAL | | | |
| Specific Gravity (g/cm³) | 1.53 | 1.33 | 1.53 |
| Glass Fiber Content (% by weight) | 20 | 0 | 20 |

EXAMPLE II

Preparation of a Composite Mat from Wet Chopped Glass Fiber and Non-Dispersed E-type Glass As with Example 1, PVC GMT sheets were formed. Glass/PVC composite mats were formed with two different ratios of dispersed (wet chopped strand) to non-dispersed (973 SMC Roving, obtained from Owens-Corning) glass in them. The ratios were 1:2 and 2:1. Both ratios resulted in successful formation of the composite mats.

EXAMPLE III

Preparation of a Continuous Reinforced System

The actual production involved making a suspension of PVC as in Example 1. The continuous glass roving was then pulled through the suspension of PVC. The continuous glass roving used was a TYPE 30® (obtained from Owens-Corning) roving that was not dried i.e. containing 14% water by weight and contained a sizing designed for use in wet processes.

What is claimed is:

1. A process for the preparation of a reinforced composite comprising:
    a) preparing an aqueous suspension of solution polymerizable polymer;
    b) adding reinforcement material directly to said aqueous polymer suspension during or after the polymerization process; and
    c) removing a sufficient amount of said aqueous medium from said suspension to form a moldable composition.

2. The process of claim 1, wherein said aqueous suspension of polymer is prepared from the group consisting of dry polymer, wet polymer, or solution polymerizable monomer.

3. The process of claim 1, wherein said reinforcement material is added wet.

4. The process of claim 1, wherein said reinforcement material is added dry.

5. The process of claim 1, wherein said reinforcement material is continuous.

6. The process of claim 1, wherein said reinforcement material is discontinuous.

7. The process of claim 1, wherein said reinforcement material is selected from the group comprising: dispersible, nondispersible, or combinations of the two forms.

8. The process of claim 7, wherein said dispersible reinforcement is selected from the group comprising: wet chopped strands, aramides, carbon, polyvinyl alcohol, hemp, jute, organic materials, mineral fibers and rayon.

9. The process of claim 7, wherein said non-dispersible reinforcement is selected from the group comprising: dry used chopped glass strands; glass fibers designed for processes such as SMC molding, BMC molding and continuous panel fabrication; chopped and continuous reinforcements such as aramide, carbon, glass, wollastonite, and jute; mica, flake glass, glass and carbon spheres, mats, mineral fibers, organic materials and fabrics.

10. The process of claim 8, wherein said wet chopped glass strands have a length of about 3.2 mm to about 50.8 mm.

11. A process for the preparation of a reinforced composite that substantially retains the length of the added reinforcement material comprising:
   a) preparing an aqueous suspension of solution polymerizable polymer;
   b) adding reinforcement material directly to said aqueous polymer suspension during or after the polymerization process; and
   c) removing a sufficient amount of said aqueous medium from said suspension to form a moldable composition.

12. A process for the preparation of a reinforced composite that substantially improves the heat history of the polymer in the resulting composite comprising:
   a) preparing an aqueous suspension of solution polymerizable polymer;
   b) adding reinforcement material directly to said aqueous polymer suspension during or after the polymerization process; and
   c) removing a sufficient amount of said aqueous medium from said suspension to form a moldable composition.

13. A process for the preparation of glass fiber reinforced polyvinyl chloride composite comprising:
   a) preparing an aqueous suspension of polyvinyl chloride;
   b) dispersing wet chopped glass strands throughout said polyvinyl chloride suspension; and
   c) removing a sufficient amount of said aqueous medium from said suspension to form a moldable composition.

14. A process for the preparation of glass fiber reinforced polyvinyl chloride composite comprising:
   a) forming a woven or nonwoven complex of reinforcement fibers;
   b) preparing an aqueous suspension of polyvinyl chloride;
   c) impregnating said polyvinyl chloride suspension throughout said reinforced complex; and
   d) drying said reinforced complex to form a moldable article.

15. A process for the preparation of glass fiber reinforced polyvinyl chloride composite comprising:
   a) preparing an aqueous suspension of polyvinyl chloride;
   b) preparing a glass fiber strand comprised of a multiplicity of substantially continuous fibers;
   c) impregnating said fiber strand with said polyvinyl chloride suspension; and removing a sufficient amount of said aqueous medium to form a moldable composition.

16. A process for the preparation of reinforced composite comprising:
   a) forming a woven or nonwoven complex of reinforcement fibers;
   b) preparing an aqueous suspension of solution polymerized polymer;
   c) impregnating said aqueous suspension throughout said reinforced complex; and
   d) drying said reinforced complex to form a moldable article.

17. A process for the preparation of reinforced composite comprising:
   a) preparing an aqueous suspension of solution polymerized polymer;
   b) preparing a fiber strand comprised of a multiplicity of substantially continuous fibers;
   c) impregnating said fiber strand with said aqueous suspension; and
   d) removing a sufficient amount of said aqueous medium to form a moldable composition.

18. The process of claim 16, wherein said reinforcement fiber is selected from the group comprising one or more of the following: mat, veil, continuous fibers, woven fibers, chopped strand mat, continuous filament mat, knitted mat or fabric or needle punch fabric.

19. A process for the preparation of a reinforced mat composite comprising:
   a) preparing an aqueous suspension of solution polymerizable polymer;
   b) adding reinforcement material directly to said aqueous polymer suspension;
   c) transferring said reinforcement and polymer mixture to a mat machine;
   d) drying said reinforced mat; and
   e) sintering the organic material onto said reinforcement if necessary for the specific polymer used.

* * * * *